June 24, 1924.  E. G. K. ANDERSON  1,498,533
SPOTLAMP
Filed July 11, 1921
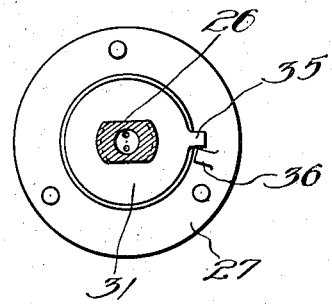
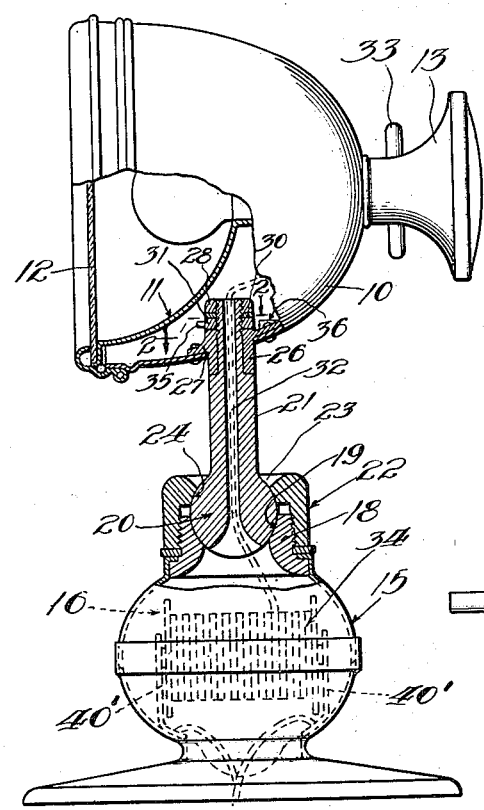
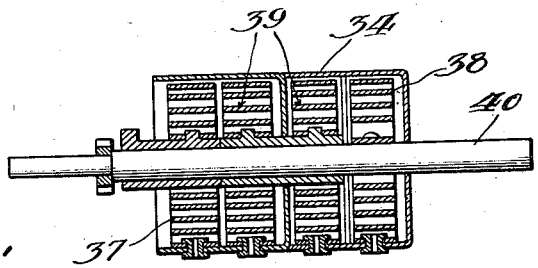
Inventor:
Ernst G. K. Anderson
by William L. Hall
Atty.

Patented June 24, 1924.

1,498,533

UNITED STATES PATENT OFFICE.

ERNST G. K. ANDERSON, OF CHICAGO, ILLINOIS, ASSIGNOR, BY MESNE ASSIGNMENTS, TO APPLETON ELECTRIC CO., OF CHICAGO, ILLINOIS, A CORPORATION OF ILLINOIS.

SPOTLAMP.

Application filed July 11, 1921. Serial No. 483,681.

*To all whom it may concern:*

Be it known that I, ERNST G. K. ANDERSON, a citizen of the United States, and a resident of Chicago, in the county of Cook and State of Illinois, have invented certain new and useful Improvements in Spotlamps; and I do hereby declare that the following is a full, clear, and exact description thereof, reference being had to the accompanying drawings, and to the characters of reference marked thereon, which form a part of this specification.

The invention relates to improvements in demountable lamps for motor and other vehicles, boats, and the like, designed to be attached to any suitably located part of the vehicle frame in reach of the driver and mounted to be universally movable in all directions and to be demounted from its normal station on the vehicle or the like to serve as a trouble lamp within the range of a conductor cord that maintains the lamp current circuit in all positions of the operable positions of the lamp.

The present invention relates more specifically to a novel combination of such a lamp with a spring rewinding reel of a character to receive a portion of said cord when the lamp is at its normal station, and from which the cord may be unwound to permit the lamp to be carried to parts of the vehicle within the length of the cord and to permit the cord to be rewound on the reel when the lamp is carried back to its normal station, the spring rewinding reel being so constructed and arranged as to maintain a substantially uniform pulling stress on the cord when unwinding it from the reel and winding it back on the reel. The reel is of such construction that it may be automatically locked from rotation when the cord is extended therefrom at lengths within the limits of its extension and capable of being unlocked and brought into operative position to exert rewinding force on the cord by a sharp pull on the cord.

The invention consists in the combination and arrangement of the parts shown in the drawings and described in the specification, and is pointed out in the appended claims.

In the drawings: Figure 1 is a partial elevation and partial section of a lamp and mounting embodying my invention.

Figure 2 is an enlarged detail section on the line 2—2 of Figure 1.

Figure 3 is an axial section of the spring lamp cord rewinding reel and fractional spring motor therefor.

As shown in the drawings, 10 designates the lamp casing, 11 its reflector, and 12 the front lens thereof and 13 designates an axial rearwardly extending hand piece equipped with a switch for the lamp circuit and constituting a support for a reducing mirror. 15 designates a two-part casing to contain the reel, indicated in dotted lines by 16 in Figure 1 and shown in section in Figure 3, and said casing may be attached to a vehicle in any suitable manner. As herein shown, the casing is provided at its upper end with an exteriorly screw-threaded member 18, which is formed with a spherical segmental seat 19 to receive the spherical end 20 of a lamp supporting stem 21, to the upper end of which is adjustably carried the lamp body 10. 22 designates an interiorly threaded nut which is threaded over the member 18 and which is centrally apertured to permit the stem 21 to pass therethrough. The said nut is provided around its opening through which the stem extends with a flaring clearance space 23 to permit an extended angular adjustment of the stem relatively to the nut 22. The nut is provided with an internal spherical segmental bearing surface 24 to bear against the lower spherical end of the stem 21 and to constitute, in connection with the spherical segmental bearing portion 19 of said bushing, a socket to receive the spherical end of said stem. The clamping pressure exerted by the nut 22 serves to normally hold the parts in any adjustment given thereto, while permitting angular adjustment of said stem and the lamp carried thereby.

Said stem extends through a bushing 26 that is fitted in a suitable opening of the lower side of the sheet metal lamp body or casing and may be attached thereto in any suitable manner, as by rivets extending through a flange 27 of said bushing and the sheet metal body around said opening. Said stem is slightly tapered to rotatively engage an interior taper of the bushing 26, and the extreme end of said stem is threaded within the lamp body to receive a nut 28 to force the tapered portions of the bushing 26 and stem into frictional locking contact, while permitting the lamp casing to be turned about the axis of the stem with the application of moderate force. Preferably a yielding washer 30 and a rigid washer 31 are interposed between said nut 28 and the flat upper end face of the bushing 26 to produce a yielding frictional tapered joint and to also lock the nut in place.

The stem 21 is preferably made hollow to afford a conduit through which extends the lamp or conductor cord 32. As herein shown, one side of the lamp circuit includes a switch 33 located in the neck 13 of the lamp casing. The lamp circuit cord 32 is normally wound on a spring rewinding reel drum 34 shown in dotted lines in Figure 1 and partially in section in Figure 3.

A lug 35 on the washer 31 is adapted to engage a lug 36 on the attaching flange of the bushing 26 to prevent the lamp casing to be turned more than a full circle and this avoids undue twisting of the lamp cord. For this purpose the threaded portion of the stem 21 is flattened and the washer 31 has a correspondingly shaped opening to interlock on the flattened portion of said stem to hold it fixed relatively to said stem.

From the foregoing description it will be apparent that the construction is so arranged as to normally function as a universally adjustable spot lamp and that when it is desired to move the lamp away from its normal position of support on the vehicle in order to use it as a trouble lamp, or for other purposes, the lamp is demounted by removing the nut 22 from the member 18 and thus permit the lamp and the stem 21 to be moved away from the support. The conductor 32 will be made of a length to correspond to the requirements of its particular use.

The reel 16 includes a rewinding spring comprising a number of sidewise disposed, fractional coil springs 37, 38, 39 that are connected in series between a shaft 40 and the drum 34, which latter constitutes the spool of the reel in a manner to operate in range as a single longer spring, as is more fully described in my prior United States Letters Patent Number 1,175,498. Current is connected from an external source, as by wipers 40', through the reel structure to the lamp cord conductor 32, a portion of which latter is wound on the reel 16.

This construction is advantageous inasmuch as it is compact and has a wide range to adapt it to long lamp cords, and its resistance to withdrawal of the cord is substantially uniform throughout its range of action when the structure functions as a trouble lamp. It also permits the spring and reel to be made within the desired limits of dimensions required as a rewinding reel in a permissibly small space.

The spring rewinding reel shown and described permits the lamp when thus demounted to serve as a trouble lamp, to be freely carried to all parts of the vehicle with a substantially uniform pull stress on the cord in all parts of the extended movements of the lamp. This spring tension need not be great inasmuch as its rewinding tension need only operate against the weight of the cord and to overcome such weight and any friction due to an indirectly laid cord finding its way to the reel. Moreover, inasmuch as the tension on the cord, when the lamp is extended to its farthest position is relatively light, the spring will not tend to pull the lamp away from the hand of the user when the locking dogs are released, nor does such tension tend to cause the locking dogs to jump out of their ratchets.

I claim:

1. A demountable extension electric lamp for motor vehicles comprising, the combination with a lamp casing and a support therefor having means of attachment to a vehicle to support it at a normal station on the vehicle, and a lamp cord to carry current from an external source to a lamp in said casing, of a rewinding reel for said lamp cord on which the cord is wound when the lamp occupies its normal station, a demountable connection between said support and lamp casing to permit demounting of said lamp casing and unwinding of the cord from the reel to adapt the lamp to function as a trouble lamp, said demountable connection comprising a stem carried by the casing having a spherical end, said support being provided with a seat to receive said spherical end, and a recessed nut surrounding said end and threaded to said support, and spring means for rotating said reel to rewind the cord thereon and to permit it to be unwound therefrom, constructed to exert a substantially uniform restoring force to rewind said cord on the reel in all parts of the range of extension of the lamp casing when functioning as a trouble lamp.

2. A universally adjustable and demountable extension electric lamp for motor vehicles comprising, the combination with a lamp casing having means of attachment to a fixed support to hold the lamp at a normal station on the vehicle, said means of attachment embracing also a universal mounting for the lamp casing, a demountable connection between the lamp casing and said means of attachment, said demountable connection comprising a stem carried by the casing having a spherical end, said support being provided with a seat to receive said spherical end, and a recessed nut surrounding said end and threaded to said support, and a lamp cord to connect the lamp with a source of current supply, of a rewinding reel on which the cord is wound when the lamp casing occupies its normal station and from which the cord is unwound when the lamp is demounted and moved away from its normal station, and a rewinding spring for said reel constructed to exert a substantially constant tension on the cord in all positions of extension of said lamp case when functioning as a trouble lamp.

3. A universally adjustable and extension trouble lamp for vehicles comprising a lamp casing, a support therefor having means of attachment to a vehicle, a demountable connection between said support and said casing, said demountable connection comprising a stem carried by the casing having a spherical end, said support being provided with a seat to receive said spherical end, and a recessed nut surrounding said end and threaded to said support, a lamp cord to connect the lamp with a source of current supply, a take-up reel for said lamp cord, and spring means for rotating the reel to rewind the cord thereon, said spring means being constructed to exert a substantially uniform restoring force to rewind the cord thereon during all parts of the unwinding and rewinding operations.

4. A universally adjustable and extension trouble lamp for vehicles comprising a lamp casing, a support therefor having means of attachment to a vehicle, a demountable connection between said support and said casing, said demountable connection comprising a stem, a pivotal mounting between said stem and casing, said stem having a rounded end, and said support being provided with a seat to receive said end, a recessed nut surrounding said end and threaded to said support, a lamp cord to connect the lamp to a source of current supply, a take-up reel for said lamp cord, and spring means for rotating the reel to rewind the cord thereon, said spring means being constructed to exert a substantially uniform restoring force to rewind the cord thereon during all parts of the unwinding and rewinding operations.

In testimony whereof I claim the foregoing as my invention, I hereunto append my signature at Chicago, Illinois, this sixth day of July, 1921.

ERNST G. K. ANDERSON.